(12) United States Patent
Inoue et al.

(10) Patent No.: US 8,769,547 B2
(45) Date of Patent: *Jul. 1, 2014

(54) REDUCED DATA TRANSFER DURING PROCESSOR CONTEXT SWITCHING

(75) Inventors: Hiroshi Inoue, Kanagawa-ken (JP);
Moriyoshi Ohara, Kanagawa-ken (JP);
Takao Moriyama, Kanagawa-ken (JP);
Yukihiko Sohda, Kanagawa-ken (JP);
Hideaki Komatsu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,713

(22) Filed: Jul. 31, 2012

(65) Prior Publication Data

US 2012/0297398 A1 Nov. 22, 2012

Related U.S. Application Data

(63) Continuation of application No. 12/172,253, filed on Jul. 13, 2008, now Pat. No. 8,266,627, which is a continuation of application No. 11/353,288, filed on Feb. 11, 2006, now Pat. No. 8,271,994.

(51) Int. Cl.
*G06F 9/46* (2006.01)
(52) U.S. Cl.
USPC .......................................... 718/108
(58) Field of Classification Search
None
See application file for complete search history.

(56) References Cited

U.S. PATENT DOCUMENTS

| | | | | |
|---|---|---|---|---|
| 5,008,812 A * | 4/1991 | Bhandarkar et al. | ........... | 712/228 |
| 6,061,711 A * | 5/2000 | Song et al. | ..................... | 718/108 |
| 7,117,501 B2 * | 10/2006 | Rosu et al. | ..................... | 719/310 |
| 7,536,517 B2 * | 5/2009 | Harris | ........................... | 711/150 |
| 8,544,020 B1 * | 9/2013 | Tene et al. | ..................... | 718/108 |

OTHER PUBLICATIONS

S. Snyder et al., "Fast Context Switches: Compiler and Architectural Support for Preemptive Scheduling," Microprocessors and Microsystems, vol. 19, No. 1, pp. 35-42 (1995).
C. Amza et al., "TreadMarks: Shared Memory Computing on Networks or Workstations," IEEE Computer, vol. 29, No. 2, pp. 18-28 (1996).

* cited by examiner

*Primary Examiner* — Meng An
*Assistant Examiner* — Eric C Wai
(74) *Attorney, Agent, or Firm* — Vazken Alexanian

(57) ABSTRACT

Data transfer during processor context switching is reduced, particularly in relation to a time-sharing microtasking programming model. Prior to switching context of a processor having local memory from a first to a second process, a portion of the local memory that does not require transfer to system memory for proper saving of data associated with the first process is determined. The context of the processor is then switched from the first to the second process, including transferring all of the local memory as the data associated with the first process, to system memory—except for the portion of the local memory that has been determined as not requiring saving to the system memory for proper saving of the data associated with the first process. Therefore, switching the context from the first to the second process results in a reduction of data transferred from the local memory to the system memory.

14 Claims, 5 Drawing Sheets

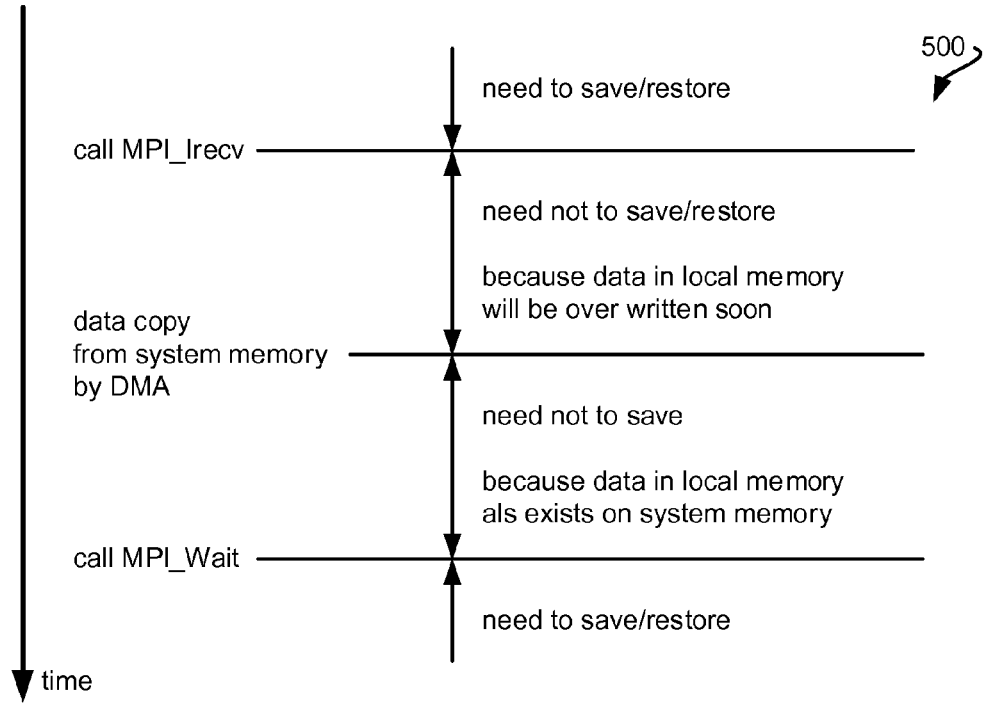
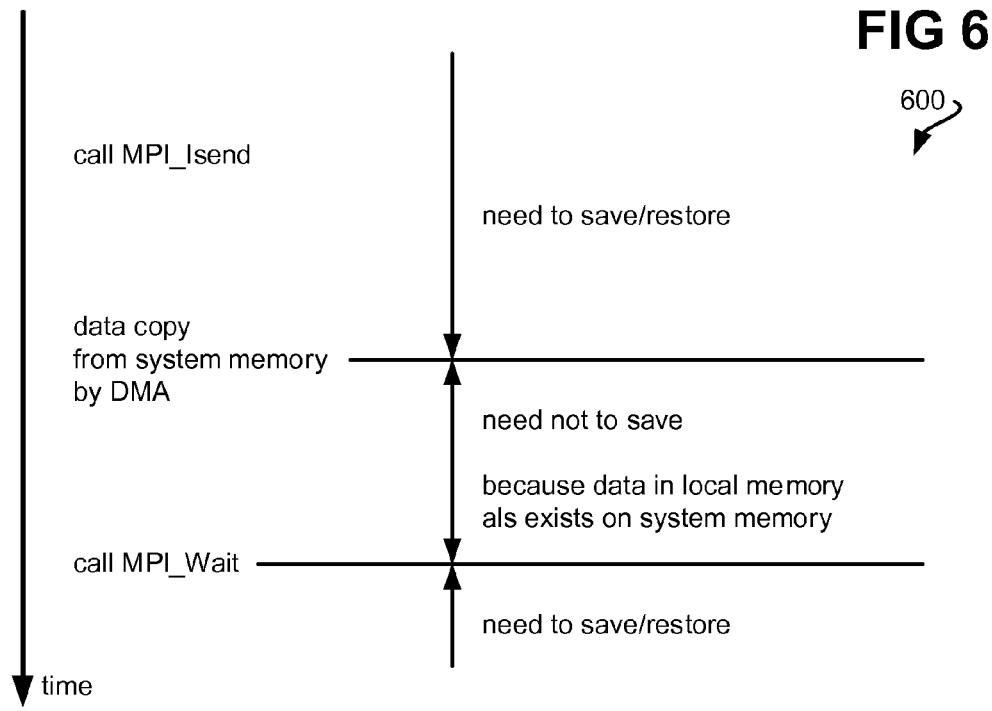

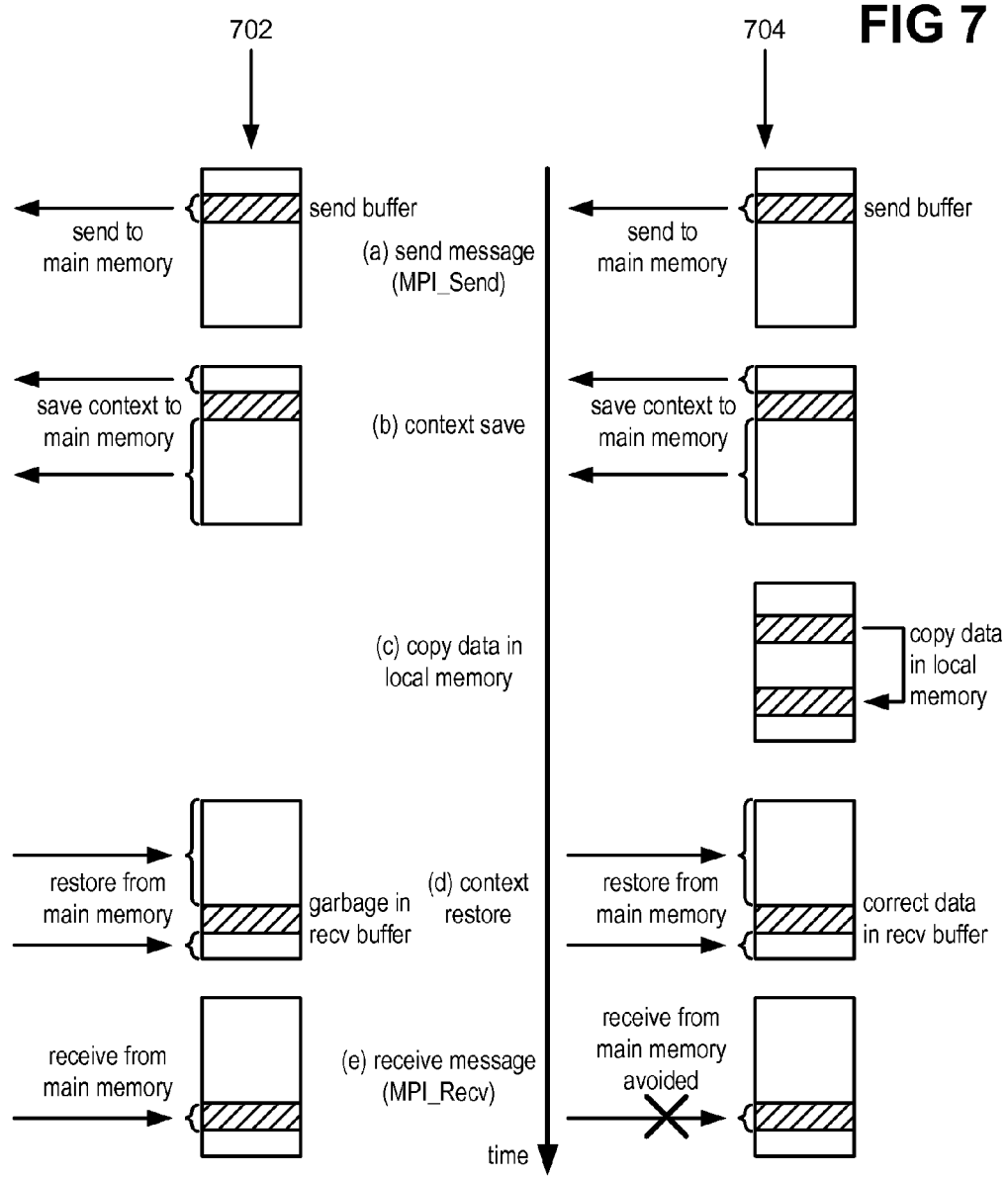

REDUCED DATA TRANSFER DURING PROCESSOR CONTEXT SWITCHING

RELATED APPLICATIONS

The present patent application is a continuation of the patent application having the Ser. No. 12/172,253, filed on Jul. 13, 2008, which issued as U.S. Pat. No. 8,266,627, on Sep. 11, 2012, and which itself is a continuation of the patent application having the Ser. No. 11/353,288, filed on Feb. 11, 2006, which issued as U.S. Pat. No. 8,271,994, on Sep. 18, 2012.

FIELD OF THE INVENTION

The present invention relates generally to a time-sharing, microtasking programming model for process execution on processors, and more particularly to context switching of a processor between a first process and a second process, such that reduced data transfer is achieved.

BACKGROUND OF THE INVENTION

Multi-tasking computing systems allow a single processor to execute many different tasks. The context of a processor refers to the current process that the processor is executing, including the data stored in local memory of or for the process that is associated with the process in question. Such local memory is typically on-die with the processor, and is that which is used by the processor to execute a process. When a processor switches contexts, this means that the processor is switching from execution of one process to execution of another process.

When a processor switches contexts from a first process to a second process, the data stored in the local memory for the processor and that is associated with the first process has to be saved to other memory, typically system memory for the computing system as a whole. The data stored in the system memory that is associated with the second process is then transferred to the local memory, so that the second process can be executed by the processor appropriately. In general, the portion of the process to be executed by the processor, and the data for that portion, have to be able to fit into the local memory for the processor.

In some types of systems, a programmer is able to explicitly control the transfer of the local memory to the system memory when a processor switches contexts. However, this can place an undue burden on the programmer. For instance, typically a computer program is made up of a number of processes, that may be able to be executed in parallel on multiple processors of a given system. As a result, the programmer has to keep track of when to switch contexts, and more significantly what local memories of which processors to save or transfer back to system memory during such context switching.

For this and other reasons, therefore, there is a need for the present invention.

SUMMARY OF THE INVENTION

The present invention relates to reduced data transfer during processor context switching, particularly in relation to a time-sharing microtasking programming model. A computer-implemented method of one embodiment of the invention performs the following. Prior to switching context of a processor having local memory from a first process to a second process, the method determines a portion of the local memory that does not require transfer to system memory for proper saving of data associated with the first process to system memory. The method then switches the context of the processor from the first process to the second process. This includes transferring all of the local memory as the data associated with the first process, to system memory—but except for the portion of the local memory that has been determined as not requiring saving to the system memory for proper saving of the data associated with the first process to the system memory. Therefore, switching the context of the processor from the first to the second process results in a reduction of data transferred from the local memory of the processor to the system memory.

A system of an embodiment of the invention includes one or more processors, local memory for each of the processors, system memory shared by all of the processors, a number of processes executed by the processors in accordance with a time-sharing, microtasking programming model, and a scheduling mechanism. A process is executed by one of the processors and data needed and used by this process has a size less than the local memory of that processor. The scheduling mechanism is to schedule execution of the processes on the processors. Switching execution on a processor from a first process to a second process results in transfer of all of the local memory of the processor, as the data associated with the first process, to system memory, except for a portion of the local memory that does not require transfer for proper saving of the data associated with the first process to the system memory.

An article of manufacture of an embodiment of the invention includes a tangible computer-readable medium, and means in the medium. The tangible medium may be a recordable data storage medium, or another type of tangible computer-readable medium. The means may be implemented as a computer program, for instance. The means is for switching the context of a processor having local memory from a first process to a second process. This includes transferring all of the local memory as the data associated with the first processor, to system memory, except for a portion of the local memory that is not required to be saved to the system memory for proper saving of the data associated with the first process to the system memory.

Embodiments of the invention provide for advantages over the prior art. Like the prior art, a programmer in accordance with the present invention can use a time-sharing, microtasking programming model to implement a computer program over a number of processes, so that the programmer does not have to concern him or herself with the transfer of local memory to system memory, and vice-versa, during context switching. However, unlike the prior art, during context switching, not necessarily all of the local memory is transferred to system memory. Rather, just the part of the local memory that is needed to properly save the data associated with the process currently being executed by the processor in question is transferred to system memory. Stated another way, the portion of local memory that is not required to be saved to system memory for proper saving of the data associated with the process currently being executed by the processor is not transferred to system memory.

As such, embodiments of the invention result in increased performance when employing the time-sharing, microtasking programming model. A programmer still does not have to concern him or herself with transferring local memory to system memory, and vice-versa, during context switching. At the same time, however, local memory is transferred intelligently to system memory, and vice-versa, so that just the data stored in the local memory is actually transferred to the system memory, and vice-versa, to improve performance.

That is, embodiments of the invention employ a time-sharing, microtasking programming model to alleviate burdens on the programmer. In such a programming model, each time a processor switches contexts, the data associated with the switching-from process is automatically transferred from local memory for the processor to system memory, and the data associated with the switching-to process is automatically transferred from the system memory to the local memory. As such, the programmer does not have concern him or herself with programming explicit instructions to control transfer of the data associated with a process to and from the local memory of a given processor. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 5 is a diagram of an example in which not all of the local memory is needed to be transferred to system memory, and vice-versa, during context switching, from the perspective of the receiver process, according to an embodiment of the invention.

FIG. 6 is a diagram of the example of FIG. 5 in which not all of the local memory is needed to be transferred to system memory, and vice-versa, during context switching, from the perspective of the sender process, according to an embodiment of the invention.

FIG. 7 is a diagram of another example in which not all of the local memory is needed to be transferred to system memory, and vice-versa, during context switching, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
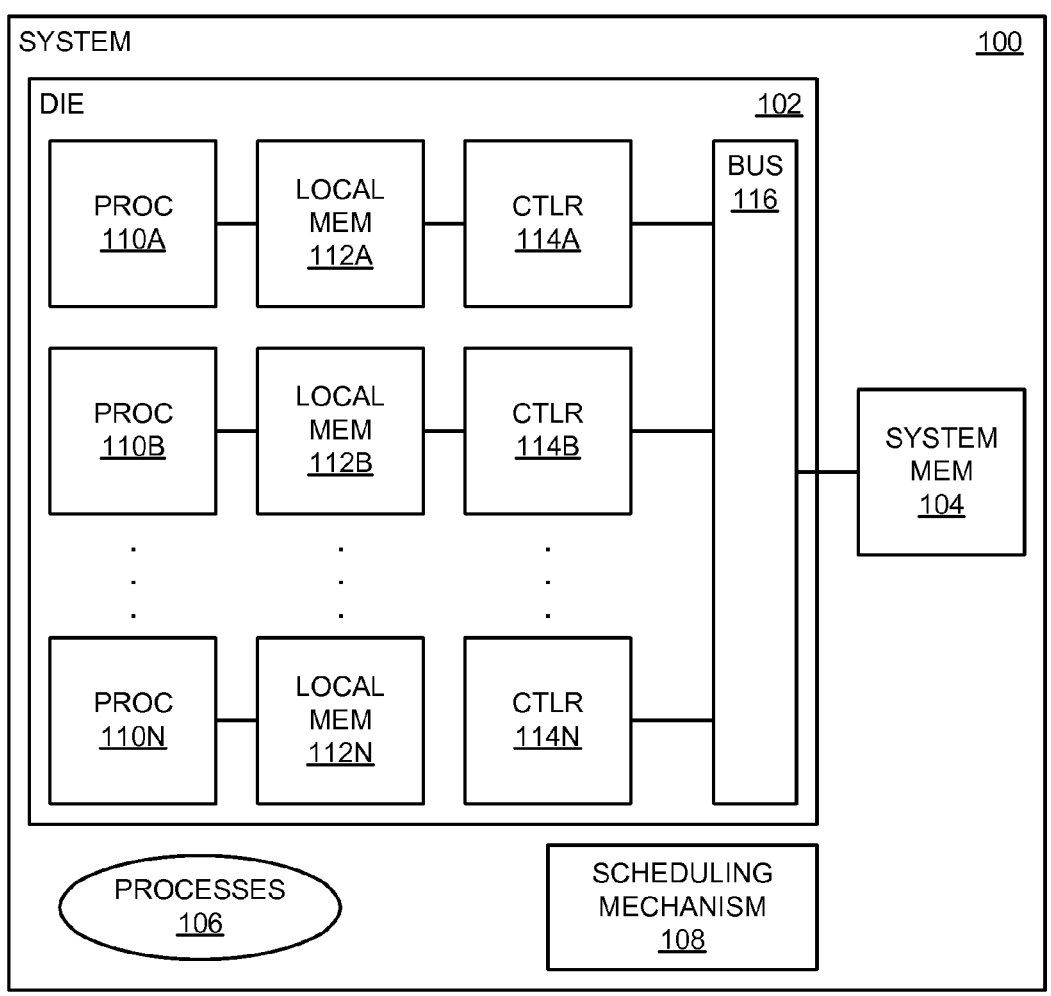
FIG. 1 is a diagram of a computerized system, according to an embodiment of the invention.

FIG. 1 shows a system 100, according to an embodiment of the invention. The system 100 is depicted as including a die, or chip, 102, system memory 104, processes 106, and a scheduling mechanism 108. As can be appreciated by those of ordinary skill within the art, the system 100 may include other components, in addition to and/or in lieu of those shown in FIG. 1.

On the die 102 is implemented a number of processors 110A, 110B, . . . , 110N, collectively referred to as the processors 110. Because the processors 110 are implemented on the same die or chip 102, they may be referred to as processor cores. While the processors 110 are shown in the embodiment of FIG. 1 as being implemented on the same die or chip 102, in another embodiment, they may each be implemented on a separate die or chip. Furthermore, embodiments of the invention are amenable to implementation where there is just a single processor.

The processors 110 have corresponding local memory 112A, 112B, . . . , 112N, collectively referred to as the local memory 112. The local memory for a given processor is directly accessible only by that processor, and not by the other processors directly. The local memory 112 may be level-two (L2) memory, such as cache memory, or it may be non-cache memory.

The local memory 112 have corresponding memory controllers 114A, 114B, . . . , 114N, collectively referred to as the controllers 114. The controllers 114 may be direct-memory access (DMA) controllers. The purpose of the controllers 114 is to transfer contents of their corresponding local memory 112 to the system memory 104, via the bus 116, and vice-versa. A shorthand notation is used herein, where it is said that local memory is transferred to system memory, or that system memory is transferred to local memory. As can be appreciated by those of ordinary skill within the art, this is understood to mean that the contents of the local memory in question are transferred to system memory, or that the contents of the system memory are transferred to the local memory in question.

The system memory 104 is shared by all the processors 110, and preferably is not part of the same dies or chips that contain the processors 110. In general, the system memory 104 is larger in size than each of the local memory 112. However, while the processors 110 can directly and quickly access their corresponding local memory 112, the same is not true of the system memory 104. That is, the processors 110 can only indirectly and more slowly access the system memory 104, via their controllers 114 copying the system memory 104 to their local memory 112, using the bus 116. The system memory 104 is thus slower than the local memory 112.

The processes 106 may be part of the same or different computer program. Each of the processes 106 includes computer code, as well as data, stored in the system memory 104. A given of the processors 110 can execute one of the processes 106 at any given time. The scheduling mechanism 108, which may be implemented in software, hardware, or a combination of software and hardware, schedules which of the processes 106 are to be executed by which of the processors 110 at various times.

When a given processor is to switch execution from a first process to a second process, it is said to switch context. That is, it switches context from the first process's context to the second process's context. The computer code and the data of the first process are transferred from the local memory of the processor to the system memory 104. Then, the code and the data of the second process are transferred from the system memory 104 to the local memory. Thereafter, the processor can begin executing the second process as appropriate.

Figure 2:
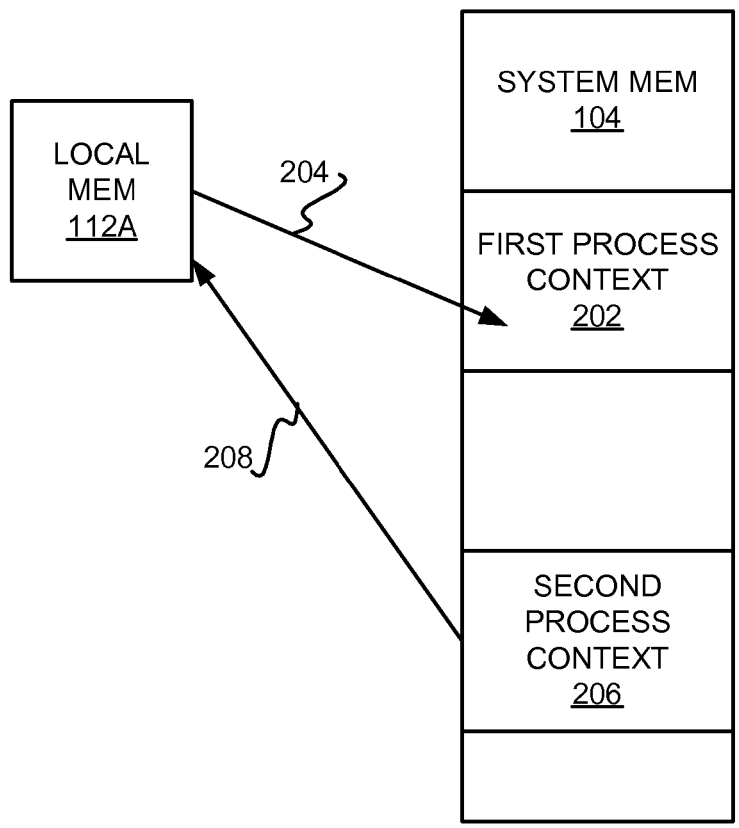
FIG. 2 is a diagram depicting context switching, according to an embodiment of the invention.

FIG. 2 illustratively depicts the context switching process, according to an embodiment of the invention, in exemplary relation to the local memory 112A for the processor 110A. The context of the first process that is currently being executed by the processor 110A is transferred from the local memory 112A to the portion 202 of the system memory 104, as denoted by the arrow 204. Thereafter, the context of the second process that is then to be executed by the processor 110A is transferred from the portion 206 of the system memory 104 to the local memory 112A, as denoted by the arrow 208.

Figure 3:
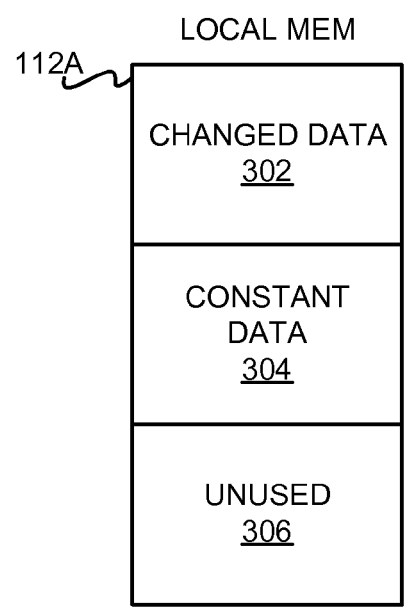
FIG. 3 is a diagram of a representative local memory to depict why it is not necessary to transfer all of the local memory to system memory during context switching, according to an embodiment of the invention.

FIG. 3 shows, however, why not the entire context of a process being switched needs to be transferred from the local memory 112A, according to an embodiment of the invention. That is, FIG. 3 shows why not all the contents of the local memory 112A need to be transferred to the system memory 104. The local memory 112A is depicted in FIG. 3 as storing the context for a process that is to be switched from by the processor 110A. As such, the local memory 112A includes a changed data portion 302, a constant data portion 304, and an unused portion 306.

Within the prior art, all the portions 302, 304, and 306 of the local memory 112A are transferred to the system memory 104 when switching context for the processor 110A. However, embodiments of the invention intelligently switch context for the processor 110A. Therefore, it is recognized that the constant data portion 304 does not need to be transferred to the system memory 104, because the data has not changed in this portion since being transferred from the system memory 104. Likewise, it is recognized that the unused data portion 306 does not need to be transferred to the system memory 104, since it is not used by the process in question being executed.

As a result, embodiments of the invention only transfer the changed data portion 302 of the local memory 112A to the system memory 104 when switching context for the process in question, and do not transfer the other portions 304 and 306 of the local memory 112A. Because less of the local memory 112A is transferred to the system memory 104 during context switching, overall system performance improves. Methods and manners by which portions of the local memory 112A not to be transferred to the system memory 104 are identified are now discussed and described.

Figure 4:
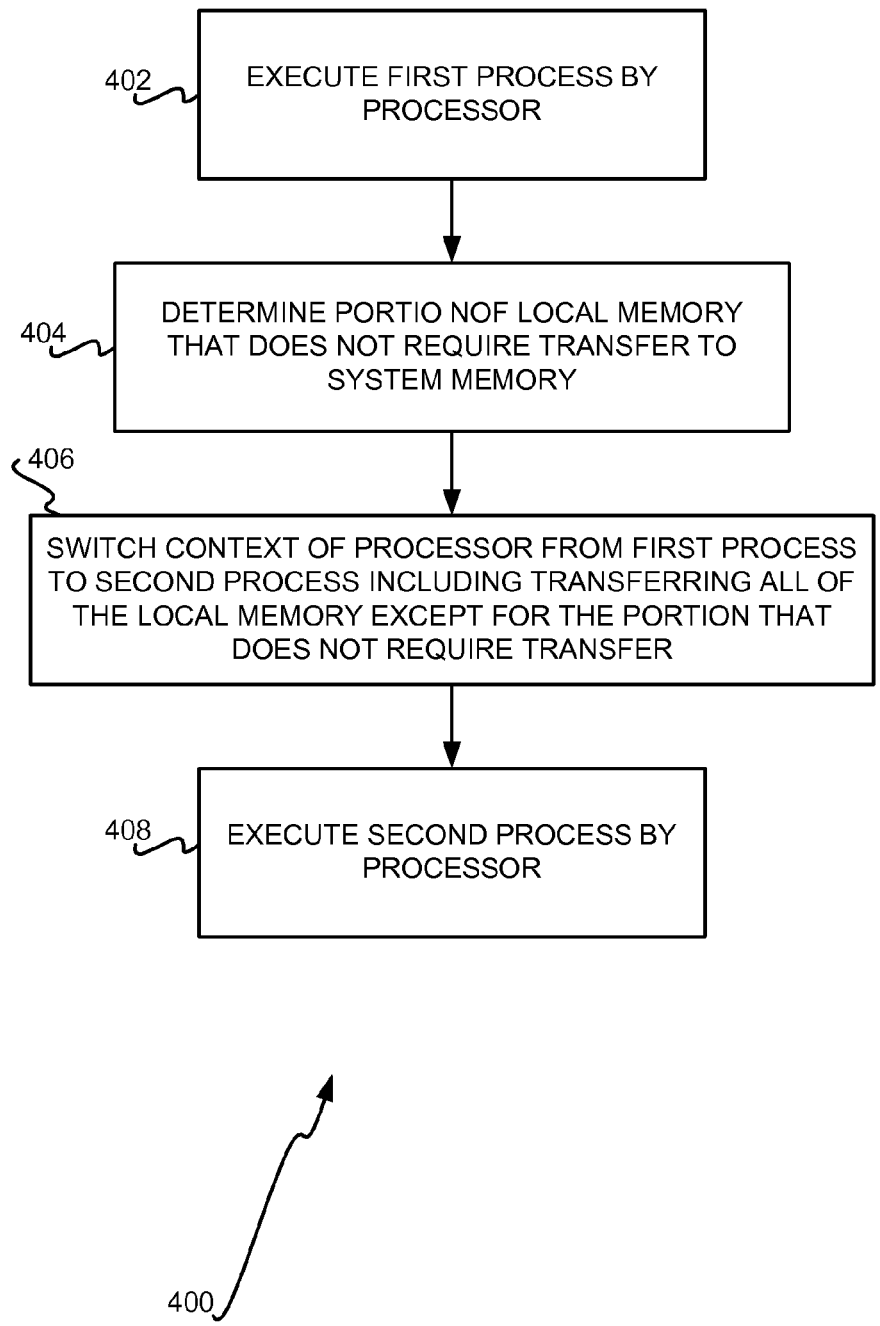
FIG. 4 is a flowchart of a method for context switching, according to an embodiment of the invention.

First, FIG. 4 shows a method 400 of the general process followed for context switching, according to an embodiment of the invention. The method 400 is described in relation to a first process and a second processor to be executed by a processor having local memory. The context of the processor is the process context that is currently or is to be executed by the processor. For instance, the context of the first process is the context of the processor when the processor is currently executing or is to execute the first process. Likewise, the context of the second process is the context of the processor when the processor is currently executing or is to execute the second process.

Therefore, the processor begins by executing the first process (402). At some point, it is decided that the processor should instead execute the second process. This decision may be made by the scheduling mechanism 108 of FIG. 1, for instance.

As a result, it is determine the portion of the local memory of the processor that does not require transfer to system memory for proper saving of the data associated with the first process to the system memory (404). Proper saving in this regard means that all the data that needs to be saved for the first process to system memory so that such data can be later retransferred back to the local memory of the same or different processor for continued execution of the first process is indeed transferred to the system memory. For example, in the example of FIG. 3, this would be the changed data portion 302, and not the portions 304 and 306 of the local memory 112A.

Determining the portion of local memory of the process that does not require transfer to system memory for proper saving of the data associated with the first process to the system memory may be accomplished by the processor automatically during context switching. Different ways by which this portion of local memory is determined are described in detail later in the detailed description. Other mechanisms and/or components of the system 100, in addition to the processor in question, may further make this determination in various embodiments of the invention.

Thereafter, the processor switches context from the first process to the second process (406). Context switching, as has been described, includes transferring all of the local memory—as the data associated with the first process—to the system memory, except for the portion of the local memory that has been determined as not requiring saving to the system memory for proper saving of the data associated with the first process to the system memory. The second process's context is then transferred from the system memory to the local memory. The processor can finally execute the second process (408).

In some embodiments, the present invention is intended for a computer program that uses a library to perform inter-process communication. In such situations, an application programming interface (API) may be called by a process to specify the portion of the local memory that does not need to be transferred to system memory when switching context. Such and other embodiments of the invention may employ a message-passing interface (MPI) to provide for communication among the processes, although this is not required by all embodiments of the invention.

That is, at least some of the embodiments described below are in relation to a sender process calling an MPI to send data to a receiver process calling the MPI, where the receiver process receives the data. Therefore, the context switches between the sender process and the receiver process. The issue, then, is determining which of the local memory does not have to be transferred to the system memory (and vice-versa) when context switching in such a situation occurs.

In one embodiment, the portion of the local memory that is not required to be transferred to system memory when switching context is determined as that which is always not being used by the process in question. That is, the process may need only a portion of the local memory in order to be executed. The other portion of the local memory, therefore, is never needed by the process, and therefore this is the portion that is not required to be transferred to system memory when switching context.

For example, within the specification of the MPI, there may be a receive buffer area for a receiver process. It may be assumed that a process which has called a message receive function enters a halt state in order to wait for data transmission from the sender process, and context saving is performed in relation to this. At that time, a memory area which is provided to this function in question acts as a receive buffer, and is that which is overwritten by received data. Therefore, the data in this area does not have to be saved or restored during context switching.

In another embodiment, the portion of the local memory that is not required to be transferred to system memory when switching context is determined as that which has not changed since being transferred from the system memory earlier, and thus is otherwise constant. That is, the process may when having its context switched to the processor, have had certain data moved from the system memory to the local memory. During execution of the process, this data may not have been modified. Therefore, the data as stored in the local memory does not need to be transferred back to the system memory during context switching away from this process.

For example, send and receive buffers can be employed in relation to the embodiment employing MPI. To perform interprocess communication, in general it may be needed that a sender process writes data temporarily to a communication buffer area within the system memory, and a receiver process reads therefrom. For instance, during the time after the data is transferred to the communication buffer within the system memory via DMA, the contents of this memory area already exists in the system memory. Therefore, there is no need to store these contents again within the system memory during context switching. Similarly, after the receiver process actually transfers the data from the system memory to the local memory, even if context switching is performed, the same data exists in both the local memory and the system memory. Therefore, there is no need to transfer this data again during context switching.

In another embodiment, the portion of the local memory that is not required to be transferred to system memory when switching context is determined as that which is not temporarily being used. This situation is different than the earlier embodiment as a portion of local memory that will always not being used. Here, for the current execution of the process in question, it can be known that a certain portion of the local memory is not being used, such that this portion does not need to be transferred to system memory. However, subsequent execution of the process may utilize this portion of the local memory, so the non-transfer of this portion of memory is not subsequently guaranteed.

For example, there may be a stack area or the like within the local memory during context switching. During the period of time until the process in question is saved next time after the process is restored by a subsequent context switch, with respect to the data that is not accessed during this time period, such data can be omitted during the most immediate context switch. For instance, when it is known that a number of context switches take place in a given function through static analysis at the time of compiling the program, through profiling, and so on, it suffices that a stack frame for all functions corresponding to an ancestor of the function may be saved at the first context switching, and restored at the last context switching. During intermediate context switching, the transfer of this stack frame is unnecessary. Unused local variables may further not need to be saved back to system memory or restored back from system memory.

Furthermore, in addition to the reduction of transfer of local memory to system memory at the time of context scheduling, a scheduling of a process can result in the reduction of the transfer of the local memory. That is, when data is shared among processes before and after a context switch, the data transfer subsequent to the context switch may be omitted in some cases, by leaving the data which was in the local memory before the context switch there during and after the context switch. For instance, when the data which is transmitted by a current process is to be received by the next-performed process within the same processor core, transmitted and received data may remain in the local memory, and need not be transferred to or from the system memory during the context switching process.

Therefore, in one embodiment, the amount of data transferred from local memory to system memory during context transfer is reduced by discriminating a memory area where omission of such transfer is achieved by using an argument of an API call, on the basis of knowledge of the semantics of the communications library API at the time of the context switch. This is now described in relation to exemplary computer program code to receive data:

```
main( ) {
    for (i=0; i<n; i++) {
        MPI_Irecv(buf, size, MPI_DOUBLE, rank_sender, tag,
            MPI_COMM_WORLD, &request);
        MPI_Wait(&request, &status);
        compute( );
    }
}
```

It is presumed that after performing the call MPI_Irecv, which is an MPI call to receive data, the data from the sender process is not yet received at the time of the MPI_Wait call, which is an MPI to halt the current (calling) process. Therefore, a context switch occurs. At this time, a memory area from the address buf to the address buf+size is specified as a receiving buffer in the MPI_Irecv, and is overwritten by received data after the process is next resumed. Specifically, since the data in this area at the time of performing the MPI_Irecv is not going to be used in the future, during the period after performing the MPI_Irecv and before actual data transfer, the data in this area need not be saved even when switching context. Furthermore, when the context of this process is next read, the data in this area need not be restored (i.e., transferred back to local memory from system memory). During the period after the completion of the actual data transfer until MPI_Wait, with respect to the data in this area, the same data is retained within the communication buffer of the system memory, such that saving the context (i.e., transferring the local memory to the system memory) is unnecessary.

FIG. 5 shows a summary 500 of this example, such that the entire contents of local memory do not need to be saved to system memory, according to an embodiment of the invention. Within the memory area to be used as the receive buffer in MPI_Irecv, the data in this area is unnecessary during the period of time from the completion of MPI_Irecv until the data is actually transferred after completion of an MPI_Isend (which is the MPI call to send the data being received via the call MPI_Irecv), for instance, at the sender process to actually send the data. Thus, saving and restoring this context is unnecessary. Since the data in this area is present in the system memory during the period until the performance of the MPI-Wait after the actual data transfer, resaving the context is not necessary. A reduction in the amount of data during context switching is thus incurred.

FIG. 6 shows a summary 600 of this example, from the perspective of the sender process, according to an embodiment of the invention. That is, while the summary 500 of FIG. 5 shows this example from the perspective of execution of the receiver process, the summary 600 of FIG. 6 depicts this example from the perspective of execution of the sender processor. Similar to FIG. 5, then, during the period of time after the completion of the actual data transfer until the MPI_Wait, saving the context in this area is unnecessary.

In another embodiment, the amount of data transferred from local memory to system memory during an immediate context transfer is reduced by determining the portion of the local memory that does not require transfer to the system memory until later context switching. That is, such data is not transferred during the period until another, later context switch occurs, and such data may be determined by static analysis of the computer program code of a process. This is now described in relation to the following exemplary computer program code:

```
main( ) {
int i;
....
i = communicate( );
....
}
int communicate(void) {
int result;
.... // perform some calculation
MPI_Irecv(buf1, size, MPI_DOUBLE, rank_sender1, tag,
    MPI_COMM_WORLD, &request);
MPI_Wait(&request, &status); //context switch in MPI_Wait
.... // perform some calculation
MPI_Irecv(buf2, size, MPI_DOUBLE, rank_sender2, tag,
    MPI_COMM_WORLD, &request);
MPI_Wait(&request, &status); //context switch in MPI_Wait
return result;
}
```

This computer program code assumes that it is known before execution, by using static analysis, that context switches occur at two MPI_Wait calls within the communicate function. In this situation, a stack frame of a main function is essentially unnecessary between the first and second context switches. For this reason, when returning from the first context switch and when saving data within the second context switch, the stack frame of the main function does not need to be transferred.

However, this optimization may not be applied in the case where there is access to the stack frame of the main function via some pointer. Otherwise, it may be possible that at this entrance of the communicate function the stack frame of the main function is saved to system memory, and the saving of this portion of local memory is omitted during the first context switch. This approach is more effective, since the transfer function is hidden within the communicate function.

Furthermore, saving and restoring of unnecessary data other than the stack frame can be omitted. In the extreme situation where the first MPI_Wait and the second MPI_Irecv are performed consecutively, such that there is no code in-between, it suffices that only the extremely limited data, such as text data, are transferred upon returning from the context switch in the first MPI_Wait. Additionally, within the communicate function, local variables other than the variable result are never used after the second context switch. Therefore, these other local variables, as stored in the local memory, do not need to be transferred to system memory during the second context switch, nor do they need to be restored thereafter.

In another embodiment, the amount of data transferred from local memory to system memory during context transfer is reduced by determining the portion of the local memory that is shared between the process being switched from and the process being switched to. That is, data that is shared between these two processes may remain in the local memory, and does not need to be transferred to or from system memory during context switching from the first such process to the second such process. FIG. 7 shows such an example 700 of reducing the amount of data transferred from local memory to system memory during context switching, according to an embodiment of the invention. In particular, the left column 702 shows the case where such shared data is still transferred back to and from system memory during context switching, whereas the right column 704 shows the inventive case where such shared data is not transferred back to and from system memory during context switching.

It is assumed that the sender process executes synchronous transmission of data, via MPI_Isend, and the receiver process is now at a halt state waiting for reception but ultimately receives the data. Therefore, in order to execute the synchronous transmission of data, when the sender process temporarily enters into the halt state and the context is switched to the receiver process, this transmitted data is shared by both processes. As a result, retransfer of the data from local memory to system memory, and then from the system memory to the local memory, is unnecessary. That is, in comparing the left column 702 and the right column 704, it is apparent that the same result is achieved, even though data transfer back to system memory does not occur in the right column 704. Therefore, this means that the right column 704 provides for better system performance, while still achieving the same functionality as the left column 702.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A computer-implemented method comprising:
prior to switching context of a processor having local memory from a first process to a second process running within a same processor core of the processor, determining a portion of the local memory that does not require transfer to system memory for proper saving of data associated with the first process to the system memory including determining a first portion of the local memory as always unused by the first process during execution of the first process by the processor, a second portion of the local memory as already being identical to a corresponding portion of the system memory such that transfer is not required, and a third portion of the local memory as being shared between the first and the second process; and
switching the context of the processor from the first process to the second process, including transferring all of the local memory as the data associated with the first process to the system memory, except for the first, second, and third portion of the local memory that has been determined as not requiring saving to the system memory for proper saving of the data associated with the first process to the system memory,
such that switching the context of the processor from the first process to the second process results in a reduction of data transferred from the local memory of the processor to the system memory.

2. The method of claim 1, wherein switching the context of the processor from the first process to the second process further includes transferring a portion of the system memory associated with the second process to the local memory of the processor, for use by the second process during execution of the second process by the processor.

3. The method of claim 1, further comprising:
prior to switching the context of the processor from the first process to the second process, executing the first process by the processor; and, after switching the context of the processor from the first process to the second process, executing the second process by the processor.

4. The method of claim 1, wherein determining the portion of the local memory that does not require transfer to the system memory for proper saving of the data associated with the first process to the system memory comprises determining the portion of the local memory as temporarily unused by the first process during execution of the first process by the processor.

5. The method of claim 1, wherein determining the portion of the local memory that does not require transfer to the system memory for proper saving of the data associated with the first process to the system memory comprises calling an application programming interface (API) by the first process to specify the portion of the local memory.

6. The method of claim 1, wherein determining the portion of the local memory that does not require transfer to the system memory for proper saving of the data associated with the first process to the system memory comprises determining the portion of the local memory as not requiring transfer to the system memory until subsequent switching of the context in relation to the first process.

7. The method of claim 1, wherein the user is not involved in determining a second portion of the local memory that does require transfer to the system memory for proper saving of the data associated with the first process to the system memory, when the context of the processor is switched from the first process to the second process.

8. A system comprising:
one or more processors;
local memory for each of the processors; system memory shared by all of the processors; a plurality of processes executed by the processors in accordance with a time-sharing, microtasking programming model, such that a process executed by one of the processors and data needed and used by the process have a size less than the local memory of the processor; and,
a scheduling mechanism to schedule execution of the processes on the processors,
such that switching execution on a processor from a first process to a second process running within a same processor core of the processor results in transfer of all of the local memory of the processor as the data associated with the first process to the system memory, except for a first, second and third portion of the local memory that does not require transfer for proper saving of the data associated with the first process to the system memory,
wherein the first portion is determined as the portion of the local memory as always unused by the first process during execution of the first process by the processor,
wherein the second portion is determined as the portion of the local memory as already being identical to a corresponding portion of the system memory such that transfer is not required, and
wherein the third portion is determined as the third portion of the local memory as being shared between the first and the second process.

9. The system of claim 8, wherein the portion of the local memory that does not require transfer for proper saving of the data associated with the first process to the system memory comprises the portion of the local memory being temporarily unused by the first process during execution of the first process by the processor.

10. The system of claim 8, wherein the first process calls an application programming interface (API) to specify the portion of the local memory that does not require transfer for proper saving of the data associated with the first process to system memory.

11. The system of claim 8, wherein the portion of the local memory that does not require transfer for proper saving of the data associated with the first process to the system memory comprises the portion of the local memory not requiring transfer to the system memory until subsequent switching of the context in relation to the first process.

12. The system of claim 8, wherein the local memory of each of the processors is smaller in size than the system memory.

13. The system of claim 8, wherein the local memory of each of the processors is faster in memory access than the system memory.

14. A computer program product comprising a storage device storing computer-readable code that when executed by a processor causes the processor to:
switch context of the processor having local memory from a first process to a second process running within a same processor core of the processor, including transferring all of the local memory as the data associated with the first process to system memory, except for a first, second, and third portion of the local memory that is not required to be saved to the system memory for proper saving of the data associated with the first process to the system memory,
wherein the first portion is determined as the portion of the local memory as always unused by the first process during execution of the first process by the processor,
wherein the second portion is determined as the portion of the local memory as already being identical to a corresponding portion of the system memory such that transfer is not required, and
wherein the third portion is determined as the third portion of the local memory as being shared between the first and the second process.

* * * * *